US009959544B2

(12) United States Patent
Di Luoffo et al.

(10) Patent No.: US 9,959,544 B2
(45) Date of Patent: May 1, 2018

(54) UPDATING AN APPLICATION ON A SMART CARD AND DISPLAYING AN ADVERTISEMENT

(75) Inventors: Vincenzo Valentino Di Luoffo, Sandy Hook, CT (US); Craig William Fellenstein, Brookfield, CT (US)

(73) Assignee: International Business Machines Corporation, Armonk, NY (US)

( * ) Notice: Subject to any disclaimer, the term of this patent is extended or adjusted under 35 U.S.C. 154(b) by 2964 days.

(21) Appl. No.: 10/443,669

(22) Filed: May 22, 2003

(65) Prior Publication Data
US 2004/0236624 A1    Nov. 25, 2004

(51) Int. Cl.
G06Q 30/02    (2012.01)
G06Q 20/34    (2012.01)

(52) U.S. Cl.
CPC ....... *G06Q 30/0201* (2013.01); *G06Q 20/341* (2013.01); *G06Q 30/02* (2013.01)

(58) Field of Classification Search
USPC ........................................................ 705/7
See application file for complete search history.

(56) References Cited

U.S. PATENT DOCUMENTS 4,079,416 A * 3/1978 Faani et al. .................... 348/130
4,211,919 A * 7/1980 Ugon ............................. 235/487
(Continued)

FOREIGN PATENT DOCUMENTS

WO    WO -0207071    * 7/2000    .............. G06K 9/62

OTHER PUBLICATIONS

Catherine Arnold (Oct. 2002), Technology reels 'em in. Marketing News, 36(21), 13. Retrieved Oct. 30, 2007, from ABI/INFORM Global database. (Document ID: 208724981).*
(Continued)

*Primary Examiner* — Ivan R Goldberg
*Assistant Examiner* — Venay Puri
(74) *Attorney, Agent, or Firm* — Yee and Associates, P.C.; Lisa J. Ulright

(57) ABSTRACT

A method and apparatus for linking an application service provider to a chipholder during a post issuance operation involving the chipholder. The method and apparatus is implemented by a set of extensible markup language structures for transmitting promotional content and application content information to a chipholder in a smart card system. The smart card system comprises a chip management system (CMS), a distribution server, a security server, an application provider (AP), and a computer system connected by a network. Extensible markup language (SML) is used for post issuance data transactions. Specific XML structures are used to transmit application promotional data (APD) and application content data (ACD) to a CMS for packaging to chipholder during post issuance transactions. The APD and ACD are prepared by the application provider and stored in a marketing file. Responsive to receipt of a request transaction from the CMS by the AP, a determination is made whether an application identifier matches an APD and/or an ACD in the marketing file. If a match is made the APD and/or ACD is included in a response message to the CMS. Upon receipt of the response message, the CMS packages the data for transmittal to the chipholder through the distribution server.

20 Claims, 8 Drawing Sheets

(56) References Cited

U.S. PATENT DOCUMENTS

| | | | |
|---|---|---|---|
| 5,544,246 A | 8/1996 | Mandelbaum et al. | 380/23 |
| 5,649,118 A * | 7/1997 | Carlisle et al. | 705/41 |
| 5,809,241 A * | 9/1998 | Hanel et al. | 709/206 |
| 5,889,941 A * | 3/1999 | Tushie et al. | 726/26 |
| 5,898,783 A | 4/1999 | Rohrbach | |
| 5,923,759 A * | 7/1999 | Lee | 713/159 |
| 5,923,884 A * | 7/1999 | Peyret et al. | 717/167 |
| 6,034,902 A * | 3/2000 | Zettler et al. | 365/195 |
| 6,101,477 A | 8/2000 | Hohle et al. | 705/1 |
| 6,129,274 A * | 10/2000 | Suzuki | 235/381 |
| 6,131,090 A * | 10/2000 | Basso et al. | 706/23 |
| 6,195,700 B1 | 2/2001 | Bender et al. | |
| 6,199,762 B1 * | 3/2001 | Hohle | 235/492 |
| 6,216,014 B1 * | 4/2001 | Proust et al. | 455/558 |
| 6,220,510 B1 | 4/2001 | Everett et al. | 235/380 |
| 6,351,817 B1 * | 2/2002 | Flyntz | 726/4 |
| 6,390,374 B1 * | 5/2002 | Carper et al. | 235/492 |
| 6,419,161 B1 | 7/2002 | Haddad et al. | |
| 6,480,500 B1 | 11/2002 | Erimli et al. | |
| 6,715,078 B1 * | 3/2004 | Chasko et al. | 713/193 |
| 6,736,325 B1 * | 5/2004 | Peacham | 235/492 |
| 6,852,031 B1 * | 2/2005 | Rowe | 463/29 |
| 6,895,502 B1 * | 5/2005 | Fraser | 713/168 |
| 6,898,752 B2 | 5/2005 | Tucker | |
| 6,901,374 B1 * | 5/2005 | Himes | 705/14.37 |
| 6,914,586 B2 * | 7/2005 | Burkhardt | 345/87 |
| 6,993,023 B2 | 1/2006 | Foster et al. | |
| 6,999,936 B2 * | 2/2006 | Sehr | 705/5 |
| 7,010,607 B1 | 3/2006 | Bunton | |
| 7,116,673 B2 | 10/2006 | Kashyap et al. | |
| 7,190,667 B2 | 3/2007 | Susnow et al. | |
| 7,210,056 B2 | 4/2007 | Sandven et al. | |
| 7,213,254 B2 * | 5/2007 | Koplar et al. | 725/23 |
| 7,221,676 B2 | 5/2007 | Green et al. | |
| 7,306,143 B2 * | 12/2007 | Bonneau et al. | 235/380 |
| 7,307,996 B2 | 12/2007 | Forbes et al. | |
| 7,319,977 B2 * | 1/2008 | McGee et al. | 705/14.26 |
| 7,380,125 B2 * | 5/2008 | Di Luoffo et al. | 713/172 |
| 7,428,598 B2 | 9/2008 | Arndt | |
| 7,512,133 B2 | 3/2009 | Dugan et al. | |
| 7,814,010 B2 | 10/2010 | Di Luoffo et al. | |
| 7,870,022 B2 * | 1/2011 | Bous et al. | 705/14.34 |
| 7,933,968 B1 * | 4/2011 | Zimmerman | 709/217 |
| 8,316,390 B2 | 11/2012 | Zeidman | |
| 2001/0014868 A1 * | 8/2001 | Herz et al. | 705/14 |
| 2001/0023892 A1 * | 9/2001 | Hendrick | 235/380 |
| 2001/0047294 A1 | 11/2001 | Rothschild | 705/14 |
| 2002/0100055 A1 * | 7/2002 | Zeidman | 725/110 |
| 2002/0198927 A1 | 12/2002 | Craddock et al. | |
| 2003/0012382 A1 * | 1/2003 | Ferchichi et al. | 380/270 |
| 2003/0033426 A1 | 2/2003 | Beukema et al. | |
| 2003/0206548 A1 | 11/2003 | Bannai et al. | |
| 2003/0236900 A1 | 12/2003 | Chu | |
| 2004/0139018 A1 * | 7/2004 | Anderson et al. | 705/41 |
| 2004/0215543 A1 * | 10/2004 | Betz et al. | 705/35 |

OTHER PUBLICATIONS

Will Chip-Based Punch Cards Break Open Cash, Check Merchant Segment Long Closed to Credit? (Nov. 1999), Card News, 14(22), 1. Retrieved Oct. 30, 2007, from Banking Information Source database. (Document ID: 46464489).*

Business Editors (Oct. 24). mysmart.com Selects Welcome Real-time for e-Couponing; Partnership Targets 'Click and Mortar' Merchants. Business Wire,1. Retrieved Oct. 30, 2007, from Business Dateline database. (Document ID: 62860473).*

Digiorgio, Rinaldo. "Smart Cards: a Primer." JavaWorld Dec. 1, 1997. Oct. 30, 2007 <http://www.javaworld.com/javaworld/jw-12-1997/jw-12-javadev.html>.*

"Applied Card Technologies." www.card.co.uk. Dec. 16, 2001. Oct. 30, 2007. <http://web.archive.org/web/20011216053541/www.card.co.uk/index.htm 10/29/2007>.*

"Gemplus Et Welcome Real-Time." Gemplus. Oct. 11, 2000. Oct. 30, 2007 <http://web.archive.org/web/20020209153436/www.gemplus.com/about/pressroom/press/loyalty/1999/mileag_uk.htm>.*

Robertson, Lindsay. "The View From 2010—What Will a Typical Business Traveller Think of Smart Cards At the End of the Decade?" PA Consulting Group. Jan. 2002. Oct. 30, 2007 <http://www.paconsulting.com/news/by_pa/2002/by_pa_200201000.htm>.*

Joint Technical Committee, ed. "ISO 7816." Wikipedia. Wikipedia Contributors. Apr. 14, 2008. <http://en.wikipedia.org/wiki/ISO_7816>.*

Notice of allowance dated Jun. 9, 2010 regarding U.S. Appl. No. 12/491,150, 9 pages.

Final office action dated Dec. 3, 2008 regarding U.S. Appl. No. 10/718,299, 11 pages.

Non-final office action dated Sep. 10, 2007 regarding U.S. Appl. No. 10/718,299, 9 pages.

Notice of allowance dated May 21, 2008 regarding U.S. Appl. No. 10/718,299, 8 pages.

Final office action dated Feb. 22, 2008 regarding U.S. Appl. No. 10/718,299, 11 pages.

"Infiniband Architecture Specification vol. 1," Release 1.1, Nov. 6, 2002 , 1 page, accessed May 6, 2013, http://web.archive.org/web/20021127140510/http://www.infinibandta.org/specs/register/publicspec.

* cited by examiner

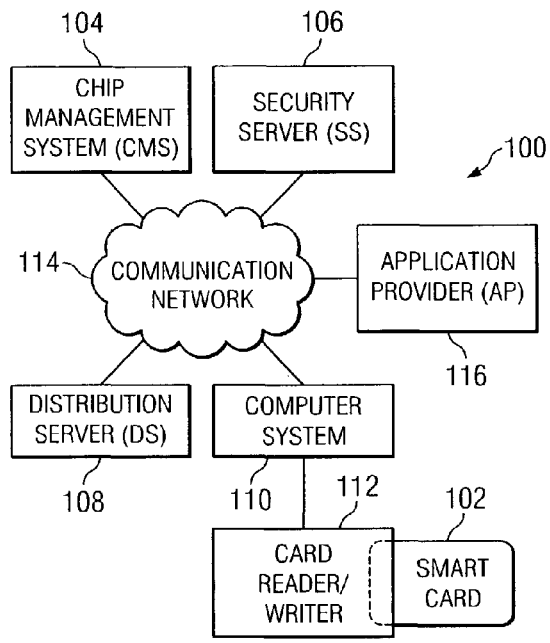
*FIG. 1A*
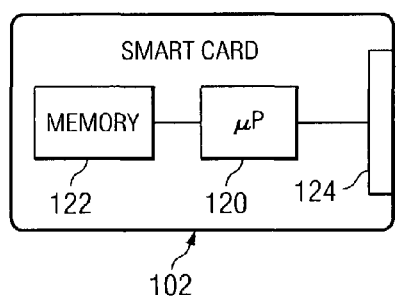
*FIG. 1B*
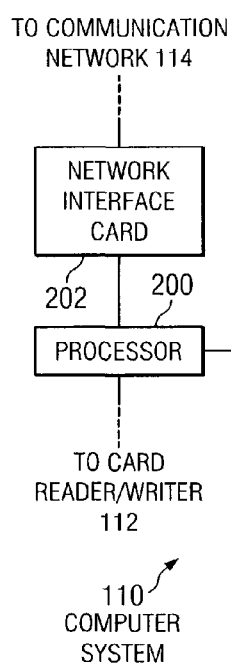
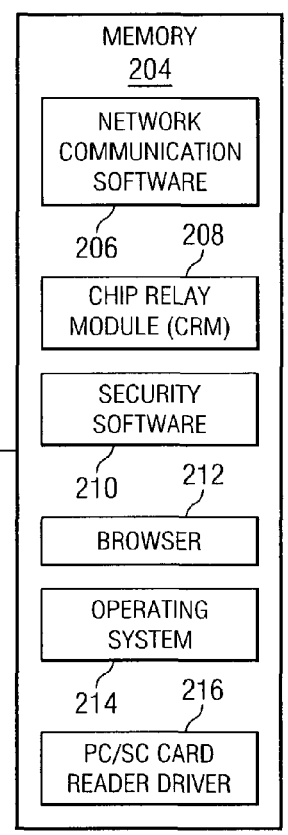
*FIG. 2A*

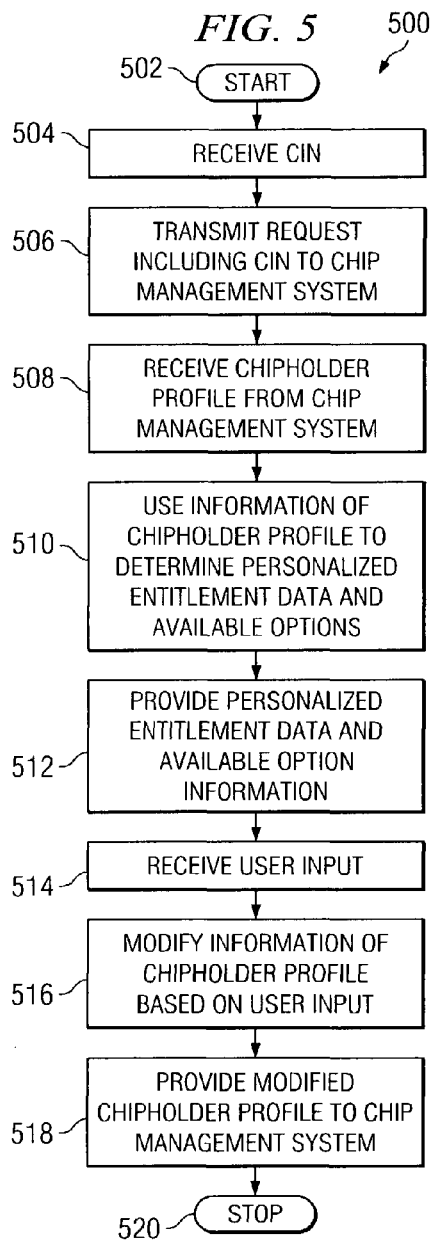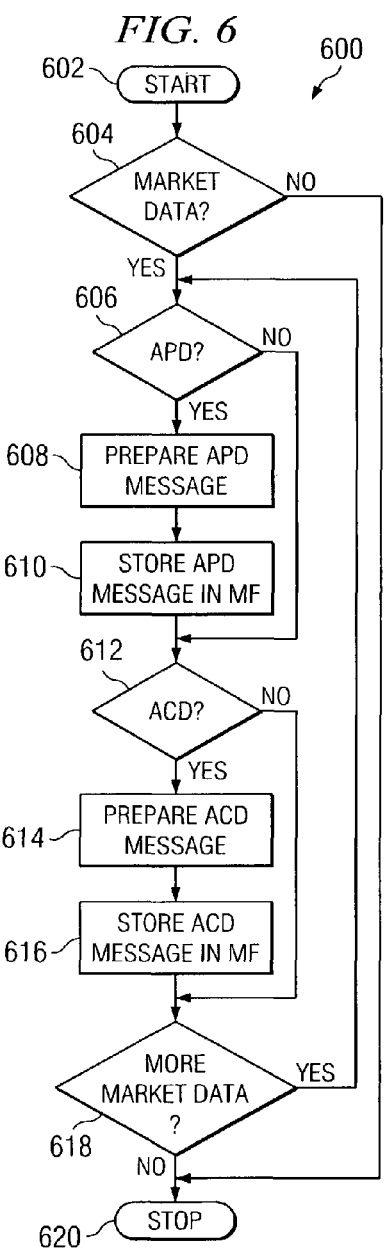

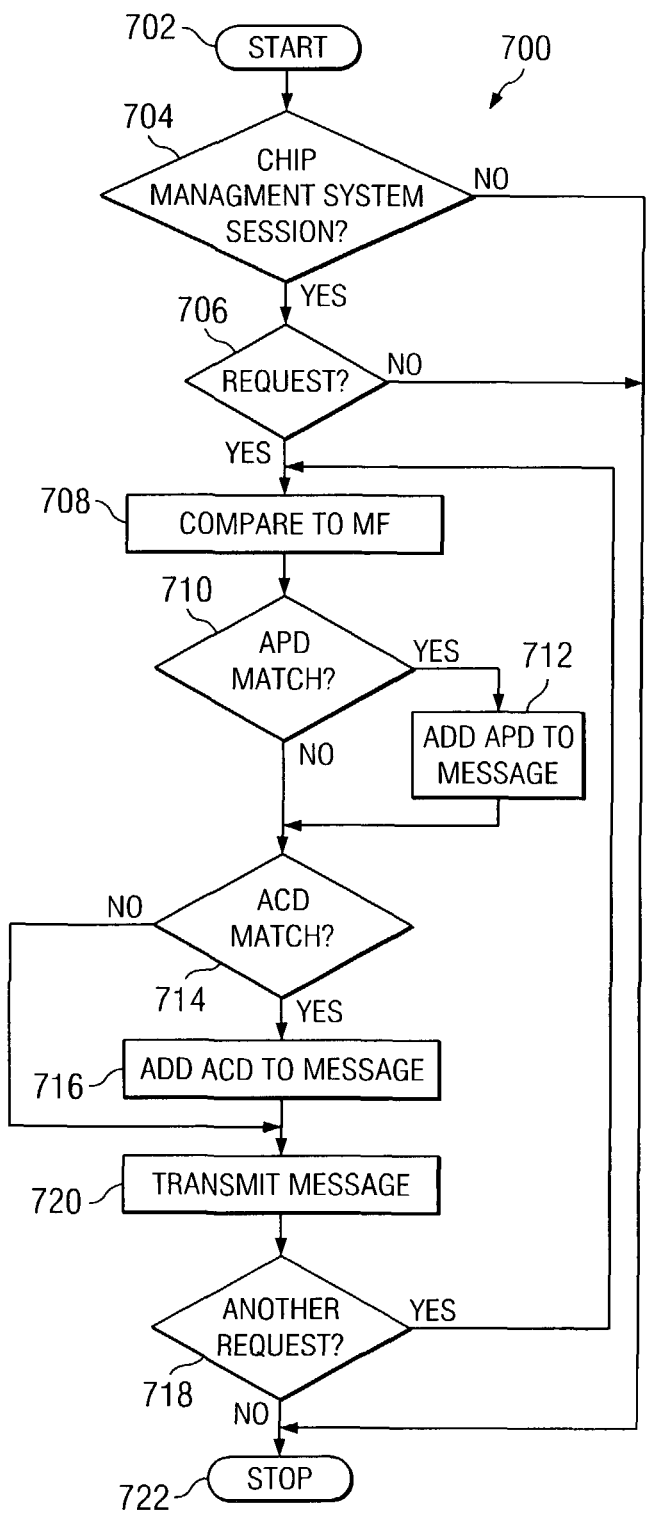

```
<CardProduct>
  <CardProductDef productId="LP01234" productVersion="1.0"/>
  <Cardholder>                       <uniqueIdentifier>132456</uniqueIdentifier>
    <CRN value="IBMGem0183"/>
    <Appl aid="032200001"/>
  </Cardholder>
</CardProduct>
```

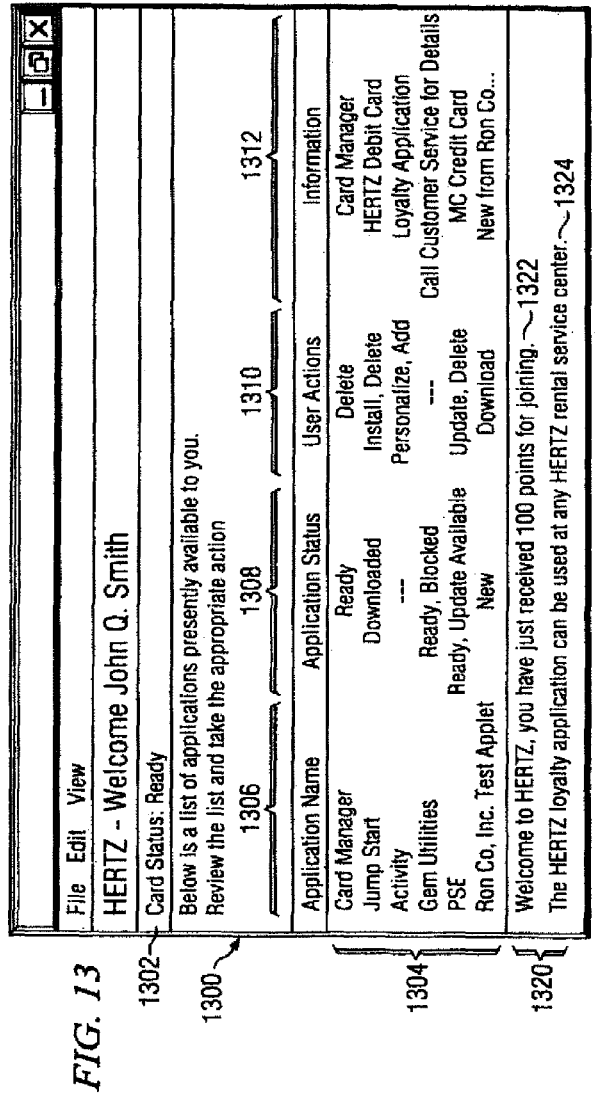

UPDATING AN APPLICATION ON A SMART CARD AND DISPLAYING AN ADVERTISEMENT

CROSS-REFERENCE TO RELATED APPLICATIONS

The subject matter of the present application is related to U.S. patent application Ser. No. 10/443,670, entitled "SMART CARD DATA TRANSACTION SYSTEM AND METHODS FOR PROVIDING HIGH LEVELS OF STORAGE AND TRANSMISSION SECURITY," and to U.S. patent application Ser. No. 10/443,680, entitled "METHOD AND APPARATUS FOR DISPLAYING EMBEDDED CHIP STATES AND EMBEDDED CHIP END-USER APPLICATION STATES," incorporated herein by reference.

FIELD OF THE INVENTION

This invention relates generally to smart cards and, more particularly, to systems for incorporating targeted marketing into smart card transactions.

BACKGROUND OF THE INVENTION

Most smart cards in use today are flat, rectangular pieces of plastic resembling credit cards having electronic circuitry embedded therein. A typical smart card includes a microprocessor coupled to a memory, and the microprocessor executes instructions and performs operations on data of at least one software application program stored in the memory. The smart card provides a compact and portable computation resource for executing transactions in area such as banking, sales, or security. Smart cards commonly appear in the form of credit cards, key-shaped tokens, and subscriber identity modules (SIMs) used in certain types of cellular telephones.

Many smart cards have a set of electrically conductive contacts arranged on an upper surface. A smart card reader/writer for communicating with such smart cards has a similarly arranged set of electrically conductive contacts. When a smart card is inserted in the smart card reader/writer, corresponding members of the two sets of contacts come into physical contact with one another. The main standards in the area of smart card and reader/writer interoperability are the International Standards Organization (ISO) 7816 standards for integrated circuit cards with contacts. The ISO 7816 standards specify interoperability at the physical, electrical, and data-link protocol levels. Other types of smart cards are "contactless." In this situation, both the smart card and the smart card reader/writer include wireless communication interfaces for communicating wirelessly (i.e., without electrical contact).

Today, advertising has many complex strategies to determine the best way to deliver advertising. Advertising may be based on a mass mailing with a small probability of success. Alternatively, some advertising may be focused on a target audience using information about the target audience that increases the probability of success. Focused advertising is more complicated because demographic must be accessed and/or collected to provide the information abut the target audience.

U.S. Pat. No. 6,220,510 discloses an a method for conducting multiple smart card operations through an architecture that allows only one application to be executed at a time and further allows for shared processing between two applications by performing a delegation function to the second application.

U.S. Pat. No. 6,216,014 discloses a system for secured independent management of multiple applications by each user of a smart card. Security is achieved by an access control policy to determine whether the data filed to be accessed by an operation is accessible.

U.S. Pat. No. 6,131,090 discloses a method and system for controlled access to information on a smart card that includes a data processing center maintained by a trusted third party for storing a database of authorizations for various service providers to access information pertaining to individuals, and for responding to request by service providers for access from terminals which communicate with the data processing center and smartcards storing the individuals information.

U.S. patent application Ser. No. 10/443,670, entitled "SMART CARD DATA TRANSACTION SYSTEM AND METHODS FOR PROVIDING HIGH LEVELS OF STORAGE AND TRANSMISSION SECURITY" discloses a smart card system for secure transmission of post issuance data to a embedded chip using a chip relay module, a plurality of hardware security modules, a first communication system having two security layers and a second communication system having four security layers.

The first communication system may be considered a server side system and comprises a chip management system, a security server having a first hardware security module, a distribution server having a second hardware security module and a computer system connected by a network The first communication system has a first security layer and a second security layer. The first security layer comprises mutual authentication that makes each component of the first communication system a trusted node to the others through client mutual authentication. The second security layer comprises system keys for secure communication between the hardware security modules.

The second communication system may be considered a client side system and comprises the computer system connected to the distribution server by a network, a PC/SC card reader driver, a Web browser application, and a chip relay module and is for secure communication between the distribution server and the chip of a smart card inserted in the card reader/writer. The second communication system has a third, fourth, fifth and sixth security layer. The third security layer comprises secure communication between the distribution server and the web browser application program using mutual authentication. The fourth security layer comprises session context security using a session key generated between the distribution server and the chip relay module. The fifth security layer comprises a data marker or flag necessary for secure transmissions between the distribution server and the chip. The sixth security layer comprises message authentication code or message authentication code encrypted messages between the distribution server and the chip.

U.S. patent application Ser. No. 10/443,680, entitled "METHOD AND APPARATUS FOR DISPLAYING EMBEDDED CHIP STATES AND EMBEDDED CHIP END-USER APPLICATION STATES," discloses a method and apparatus for managing applications installed on a smartcard. The invention comprises a Smartcard Management Program (SMP), a User Action Program (UAP), a User Command Program (UCP), an Application Status Update Program (ASUP), and a Card Status Update Program (CSUP). The SMP interfaces with smartcard communications system and accepts the user commands. The UAP obtains applications from external sources, updates the user profile, and transmits the user profile to the user for viewing on a graphical user interface. The UCP breaks the user commands into card actions and application actions and executes the card actions and application actions. The ASUP updates the user profile by changing the entry in an application name column, an application status column, a user action column, and an information column. The CSUP updates the user profile by changing the entry in the card status field.

When a person to whom a smart card is issued (a chipholder) conducts transactions with the smart card in the smart card system involving instructions and data for adding, modifying, or deleting data stored in a chip (a post issuance data transaction), the chipholder has no means to obtain additional information about a particular application being delivered from within a secure session originating at the server. Correspondingly, an Application Provider (AP) does not have a means to extend its marketing channel through the chip management system. The chip management system associates a chipholder with the embedded chip of the chipholder's smart card, and therefore is a potential marketing channel. Moreover, the chip management system provides an opportunity for continuous connectivity between the application provider and the smart card system. The continuous connectivity potentially includes times when the chipholder has not placed his or her smartcard in the smart card system. Therefore, it would be advantageous for the AP to send data related to marketing along with the data content that is targeted to the chipholder. It would be advantageous to use the chip management system as a conduit for application provider data content to the chipholder(s).

Therefore, a need exists for an apparatus and method for a centered interface for chip management, application information, and targeted promotional advertisements. Moreover, a need arises for a way to present data to a chipholder when an entitlement page is presented during any or all post issuance operations.

SUMMARY OF THE INVENTION

The invention that meets the need identified above is a method and apparatus for linking the application service provider to the chipholder during any post issuance operations involving the chipholder. The method and apparatus is implemented by a set of extensible markup language structures for transmitting promotional content and application content information to a chipholder in a smart card system. The smart card system comprises a chip management system (CMS), a distribution server, a security server, an application provider (AP) and a computer system connected by a network. The CMS stores multiple chipholder profiles, wherein each of the chipholder profiles corresponds to a different smart card and includes information regarding a person issued the smart card. The distribution server receives a chip identification number (CIN) of a smart card, and transmits a request including the CIN to the CMS. The distribution server receives a chipholder profile corresponding to the CIN from the CMS, and uses information of the chipholder profile to determine personalized entitlement data and available options of the person issued the smart card, thereby producing personalized entitlement data and available option information. The distribution server transmits the personalized entitlement data and available option information, receives user input, modifies the information of the chipholder profile according to the user input, and transmits the modified chipholder profile to the CMS.

Extensible markup language (XML) is used for post issuance data transactions. Specific XML structures are used to transmit application promotional data (APD) and application content data (ACD) to a CMS for packaging to chipholder during post issuance transactions. The APD and ACD are prepared by the application provider and stored in a marketing file. Responsive to receipt of a request transaction from the CMS by the AP, a determination is made whether an application identifier matches an APD and/or an ACD in the marketing file. If a match is made the APD and/or ACD is included in a response message to the CMS. Upon receipt of the response message, the CMS packages the data for transmittal to the chipholder through the distribution server.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1A is a diagram of one embodiment of a smart card system;

FIG. 1B is a depiction of a smart card;

FIG. 2A is a diagram of one embodiment of the computer system of FIG. 1;

FIG. 5 depicts a flow chart of one embodiment of a method for conducting smart card transactions;

FIG. 6 is a depiction of an entitlement screen;

FIG. 7 is a flow chart of the application provider process;

FIG. 12 depicts a return message; and

FIG. 13 depicts an entitlement page.

DETAILED DESCRIPTION OF THE PREFERRED EMBODIMENT

Figure 2B:
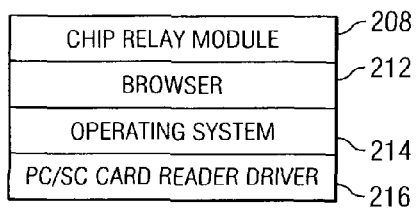
FIG. 2B is a depiction of the software stack that interacts with the CRM.

The following definitions shall be used herein:

"Application Content Data" means an informational message associated with a particular application regarding a post issuance data transaction with the particular application, and that an application provider desires to display on an entitlement page at the time of the post issuance data transaction.

"Application Promotional Data" means a promotional message associated with a particular application regarding a post issuance data transaction with the particular application, and that an application provider desires to display on an entitlement page at the time of the post issuance data transaction.

"Application Protocol Data Unit" (APDU) means a message according to the standard communication protocol defined in ISO 7816-4.

"Application Provider" (AP) means the person or entity that owns the day to day business relationship with a chipholder including without limitation the person or entity making a particular program available to a chipholder through a smart card system. Examples of an application provider are Hertz® and Club One® membership.

"Card profile" means an XML representation of a chip including all the attributes of the chip, the chip's operating system, the chip's physical characteristics, the chip's application profile and the chip's key profiles.

"Chip" means a processor and a memory contained within a smartcard wherein the processor is connected to the memory and is capable of wired or wireless communication with a card/reader writer.

"Chipholder" means a person to which a smart card has been issued by an issuer and does not include actual or potential unauthorized users.

"Chipholder profile" means information about the chip assigned to a chipholder and all of the chips' data/status including without limitation personalized entitlement data and available options of the chipholder. As used herein, the term chipholder profile shall mean a file that may contain chipholder profile information, one or more card profiles, one or more applications and/or one or more scripts.

"Chip Information Number" (CIN) means a unique number assigned to each individual chip.

"Chip Management System" (CMS) means a system that manages the lifecycle of the chip including without limitation storage and management of a card profile associated with a chipholder.

"Chip Relay Module" (CRM) means an applet that communicates with a smart card reader through a transient process having a trusted signed code that runs within a browser so that the CRM can interact between a smart card reader and a server.

"Client Card System" means a computer having an interface for communication with a smart card.

"Computer" means a machine having at least a processor, a memory and an operating system capable of interaction with a user or another computer, and includes without limitation desktop computers, notebook computers, mainframes, servers, personal digital assistants (PDAs), handheld computers, and cell phones.

"Customer Reference Number" (CRN) means a unique number assigned to each chipholder.

"Distribution Server" (DS) means a server that is a trusted node to the CMS that can, obtain the chipholder profile from the CMS and package information from the chipholder profile into APDUs. The DS has an Intelligent Gateway mode where the user is directly interfacing with the server or a router mode where another device such as an ATM is performing the interaction with the user.

"Entitlement data" is a representation of current applications(s) and chip state, what applications the end-user can add/delete, and possible administrative functions such as a new application update, or a state change to the chip or application and the entitlement data is contained in the chipholder profile.

"GlobalPlatform™ specification" means guidelines allowing consistent behavior between smart cards and applications.

"Hardware Security Module" (HSM) means hardware protected cryptographic operations and key storage.

"Input device" means a device for entering information into a smartcard or a computer and shall include without limitation a keyboard, mouse, trackball, touchpad, touchpoint device, stylus pen, and touch screen.

"Issuer Identification Number" (IIN) means a unique number assigned to an issuer.

"Issuer's master key" means a private key for the issuer of a chip.

"Issuer specific data" means standard tags according to GlobalPlatform™ specification, including without limitation Issuer Identification Number (IIN) and Chip Information Number (CIN) and cryptographic keys.

"Mutual Authentication" means recognition of one element of the smart card system by another using available protocols including but not limited to Secure Sockets Layer (SSL) version 3, browser keys and signed applets.

"Output device" means a device for displaying data and shall include without limitation cathode ray tubes (CRT), liquid crystal display (LCD) and printers.

"Personal Information Number" (PIN) means a unique number assigned to each individual smartcard.

"Personalization" means configuring a smart card for a chipholder including without limitation placing card cryptographic keys on the card.

"Personalized entitlement data and available option information" means chipholder information including without limitation a current smart card status report, a list of software application programs the chipholder is authorized to add and/or delete, and/or administrative functions that may be carried out regarding the chip or installed software application programs.

"Post issuance data" shall mean instructions and data for adding, modifying, or deleting data stored in a chip.

"Post issuance data transaction" shall mean a transaction involving post issuance data.

"Security server" means a server that stores the Issuer's master key.

"Server" means a local or remote back-end system supporting smart cards.

"Smart card" means a card used for personal or business transactions comprising at least a processor and a memory capable of supporting an operating system, application programs, storage of chip holder personalization data, application data and other data as may be required by the issuer of the smart card.

"Smart card system" means a system comprising a chip management system, a distribution server, a security server and a computer system connected by a network.

"Unauthorized user" means a person who may gain possession of a smart card but who is not intended by the issuer of the smart card to have access to the capabilities of the card created by the microprocessor coupled to a memory in the card.

FIG. 1A is a diagram of one embodiment of smart card system 100 for carrying out data transactions with smart card 102. In the embodiment of FIG. 1A, system 100 includes chip management system (CMS) 104, security server (SS) 106, distribution server (DS) 108, application provider (AP) 116 and computer system 110 coupled to card reader/writer 112.

As indicated in FIG. 1A, CMS 104, SS 106, DS 108, and computer system 110 are all coupled to communication network 114. Communication network 114 includes, without limitation, the public switched telephone network (PSTN) and/or the Internet. As described in detail below, computer system 110, CMS 104, SS 106, AP 116, and DS 108 communicate with one another via communication network 114, and data transactions with smart card 102 are carried out via a secure communication channel established within communication network 114.

FIG. 1B depicts smart card 102. Smart card 102 includes microprocessor 120 coupled to memory 122, and is capable of storing at least one software application program in the memory. Each software application program includes instructions and data. Microprocessor 120 is coupled to interface 124 which is adapted for coupling with a card reader writer (e.g., FIG. 1A card reader writer 112).

In the embodiment of FIG. 1A, smart card 102 is shown partially inserted into card reader/writer 112. In general, smart card 102 is capable of communicating with card reader/writer 112, and card reader/writer 112 is capable of communicating with smart card 102. More specifically, card reader/writer 112 is capable of reading data from, and writing data to, smart card 102. Alternatively, card reader/writer 112 may be a reader only such as a cellular phone. Some cellular phones have dual chip support. Global System for Mobile Communication (GSM) phones have only one SIM chip whereby the reader is the GSM phone and all applications would communicate through the wireless link of the GSM phone. Persons skilled in the art know that other cellular telephones have dual slots where one slot is for SIM and the other slot is for the smart card.

For example, smart card 102 may have a set of electrically conductive contacts (not shown) arranged on an upper surface, and card reader/writer 112 may have a similarly arranged set of electrically conductive contacts (not shown). Smart card 102 and card reader/writer 112 may, for example, comply with the International Standards Organization (ISO) 7816 standards for integrated circuit cards with contacts. When smart card 102 is inserted into card reader/writer 112, corresponding members of the two sets of contacts may come into physical contact with one another. Alternately, both card reader/writer 112 and smart card 102 may include wireless communication interfaces for communicating without electrical contact. In addition, card reader/writer 112 and smart card 102 are preferably capable of establishing and carrying out secure communications as described below.

In general, computer system 110 and card reader/writer 112 form a client card system with smart card read/write capability. Computer system 110 and card reader/writer 112 may form, for example, smart card update terminal, a point-of-sale terminal, or an automatic teller machine (ATM).

FIG. 2A is a diagram of one embodiment of computer system 110 of FIG. 1. In the embodiment of FIG. 2A, computer system 110 includes processor 200, network interface card 202, and memory 204. Memory 204 stores network communication software 206, Chip Relay Module (CRM) 208, security software 210, browser 212, operating system 214 and PC/SC card reader driver 216. Processor 200 is coupled to memory 204, and, in general, fetches and executes instructions and data of network communication software 206, CRM 208, and security software 210.

FIG. 2B depicts software stack 200 of CRM 208, browser 212, operating system 214 and PC/SC card reader driver 216. Alternatively, client stack may include software for wireless devices with no reader.

In one embodiment, communication network 114 of FIG. 1A includes the Internet, and network communication software 206 is a Web browser application program such as browser 212. Suitable Web browser application programs include Microsoft® Internet Explorer (Microsoft Corporation, Redmond, Wash.), and Netscape Navigator® (Netscape Communications Corporation, Mountain View, Calif.). In FIG. 2A, network interface card 202 is coupled between processor 200 and communication network 114 of FIG. 1A. In general, network interface card 202 is adapted for connection to communication network 114, and forms a hardware portion of a first communication system of computer system 110. A software portion of the first communication system includes network communication software 206. The software portion includes PC/SC card reader driver 216 associated with network interface card 202. In general, computer system 110 communicates with CMS 104, SS 106, and/or DS 108 (see FIG. 1) via the first communication system. CMS 104, SS 106, DS 108 and computer system 110 are trusted nodes to each other through mutual authentication in the first communication system having a first security layer in smart card system 100. As indicated in FIG. 2A, processor 200 is coupled to card reader/writer 112 (see FIG. 1A). As described above, card reader/writer 112 is capable of reading data from, and writing data to, smart card 102 (see FIG. 1A). In addition, in one embodiment described in more detail below, card reader/writer 112 also includes an input device for receiving user input and an output device for presenting data to the user. In general, CRM 208 stored in memory 204 includes instructions and data for communicating with card reader/writer 112 and/or a smart card inserted in card reader/writer 112. Processor 200 fetches and executes the instructions and data of CRM 208 to communicate with card reader/writer 112 and/or the smart card inserted in card reader/writer 112.

Card reader/writer 112 of FIG. 1A may, for example, include an interface device coupled between processor 200 and other hardware of card reader/writer 112. The interface device may form a hardware portion of a second communication system of computer system 110. A software portion of the second communication system may include CRM 208, and, for example, a driver program such as PC/SC card reader driver 216 associated with card reader/writer 112. Smart card 102 inserted into card reader/writer 112 may communicate with DS 108 via the second communication system as explained below. CRM 208 may be in memory 204 of computer system 110. In the preferred embodiment, CRM 208 is downloaded to browser 212 after smart card 102 is inserted into card reader/writer 112 and after microprocessor 120 of smart card 102 is authenticated by mutual authentication. One example of a suitable mutual authentication mechanism is a smart card having a secure access application such as an X509 certificate and a private web key on the card. The website that the chipholder is logging into is the authentication mechanism. DS 108 will request that the chipholder insert the chip into the reader and that the chipholder insert a PIN or password so that the chipholder may also be authenticated to the chip. The chips' private web key will exchange information between the chipholder and server for mutual authentication. The server will authenticate the chipholder to the website. CRM 208 establishes secure communication between microprocessor 120 of smart card 102 and DS 108 using mutual authentication to establish the third security layer in smart card system 100. The secure communication in the second communication system allows transmission of the chip information number (CIN) through the DS 108 to the first communication system.

Figure 3:
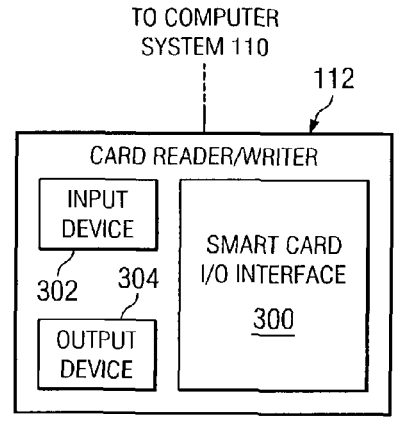
FIG. 3 is a diagram of one embodiment of the card reader/writer of FIG. 1.

FIG. 3 is a diagram of one embodiment of card reader/writer 112 of FIG. 1A. In the embodiment of FIG. 3, card reader/writer 112 includes smart card input/output (I/O) interface 300, input device 302, and output device 304. In general, smart card input/output (I/O) interface 300 is capable of reading data from, and writing data to, a smart card brought into contact with (wired), or into proximity of (wireless), smart card input/output (I/O) interface 300.

Input device 302 is adapted for receiving user input. Input device 302 includes, without limitation, a keypad. Card reader/writer 112 provides the user input to computer system 110 (see FIGS. 1A and 2A). Output device 304 is, in general, adapted for providing data to the user. Output device 304 includes, without limitation, a liquid crystal display (LCD). Card reader/writer 112 receives output data from computer system 110 (see FIGS. 1A and 2A) and presents the output data to the user via output device 304.

Figure 4:
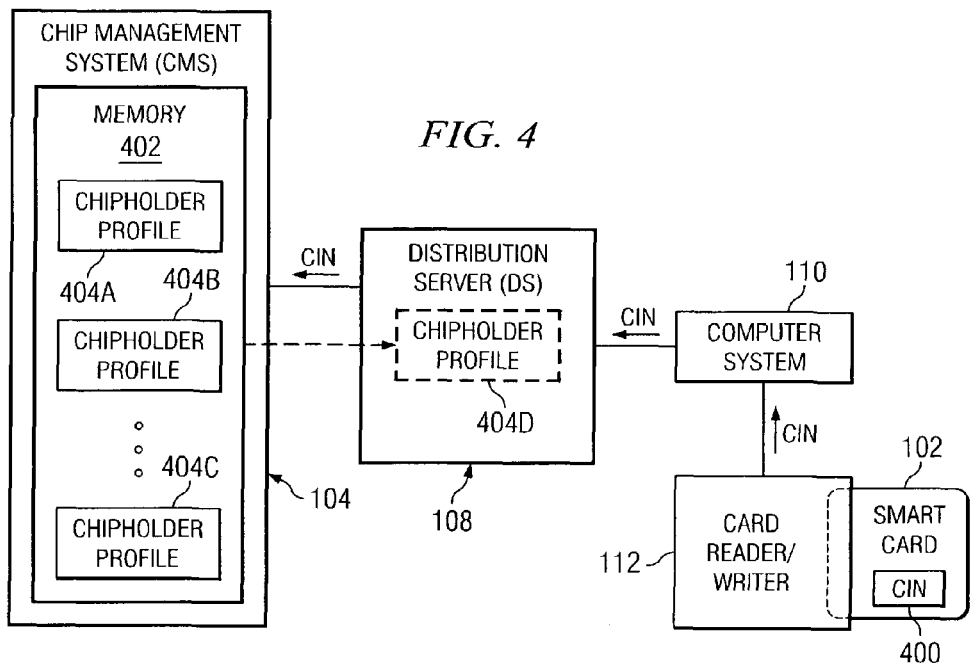
FIG. 4 is a diagram depicting an initial portion of a smart card transaction carried out in the system of FIG. 1.

FIG. 4 is a diagram depicting an initial portion of a smart card transaction carried out in system 100 of FIG. 1A. Such transactions may involve, for example, post-issuance operations such as software application program loads and/or deletions. In the embodiment of FIG. 4, DS 108 authenticates a user inserting smart card 102 into card reader/writer 112. Such authentication may involve, for example, a mutual authentication and/or the user entering a personal identification number (PIN) via input device 302 of card reader/writer 112 (see FIG. 3). Persons skilled in the art recognize that a PIN may also be a password depending on the application. In GlobalPlatform™ cards, a PIN can be a Global PIN for the card and an application may support the Global PIN or the application may have its own PIN.

In the embodiment of FIG. 4, smart card 102 includes a chip identification number (CIN) 400. CIN 400 may be, for example, stored in a read only memory (ROM) of smart card 102. Following authentication of the user, CRM 208 of computer system 110 (see FIG. 2A) requests CIN 400 from smart card 102 and smart card 102 responds by providing CIN 400 to computer system 110 as indicated in FIG. 4. CRM 208 of computer system 110 provides CIN 400 to DS 108. As described in more detail below, DS 108 provides a request to CMS 104 including CIN 400.

In the embodiment of FIG. 4, CMS 104 incldes memory 402 storing multiple chipholder profiles 404A, 404B, and 404C.

Each of the chipholder profiles 404 includes information associated with a different chipholder. In general, CMS 104 stores and maintains chipholder profiles 404. Each chipholder profile 404 also includes data regarding the corresponding smart card. For example, a given chipholder profile 404 would expectedly include the CIN 400 of the corresponding smart card 102, as well as information regarding software application programs stored in a memory system of the smart card, entitlement data regarding the stored applications, and other information as desired by the issuer of the smart card. In a separate process, chipholder profiles including applications, scripts and card profiles are tested at a security server such as SS 106 (see FIG. 1) to ensure that there are no patterns in the data indicating a security concern such as virus, and that an application is not a rogue application that has been placed on a card without issuer approval.

Each chipholder profile, represented in FIG. 4 by chipholder profiles 404A, 404B, and 404C, may include a card profile for one or more smart cards that have been issued to a user. Each card profile contains application and key profiles depending on the number of applications and other information. The card profile also contains a key reference that is used to obtain the corresponding issuer's master key from the security server, if needed. A specific chipholder profile is identified by CIN 400. The CIN 400 is transmitted via the third security layer so that the corresponding chipholder profile may be identified.

In response to the request including CIN 400 from DS 108, CMS 104 provides the corresponding chipholder profile, labeled 404D, to DS 108. After receiving chipholder profile 404D corresponding to CIN 400 of smart card 102, DS 108 processes the information of chipholder profile 404D, determines personalized entitlement data and available options of the chipholder, and sends the personalized entitlement data and available option information to computer system 110. CRM 208 of computer system 110 (see FIG. 2A) processes the personalized entitlement data and available option information, thereby generating output data, and provides the output data to card reader/writer 112 for output to the user.

In response to the output conveying the personalized entitlement data and available options, the user may, for example, select a specific option. In this situation, the option is relayed to DS 108 via computer system 110, and is processed by DS 108. The option may include, without limitation, the transmitting of post-issuance data from CMS 104 to smart card 102. As the session transpires, DS 108 modifies the information of chipholder profile 404D as needed. At the end of the session, if chipholder profile 404D has been modified, DS 108 transmits updated chipholder profile 404D to CMS 104, and CMS 104 stores modified chipholder profile 404D. Chipholder profile 404D is modified by updating a stored original version of chipholder profile 404D.

FIG. 5 depicts a flow chart of one embodiment of method 500 for conducting smart card transactions (MSCT). MSCT 500 may be embodied within DS 108 (see FIGS. 1 and 4). MSCT 500 starts (502). A chip identification number (CIN) of a smart card that has been inserted in card reader/writer 112 (see FIGS. 1 and 4) is received (504). A request including the CIN is provided to CMS 104 (see FIGS. 1A and 4) having a memory containing a plurality of chipholder profiles (506).

A chipholder profile corresponding to the CIN is received from CMS 104 (see FIGS. 1A and 4) (508). Personalized entitlement data and available option information is produced (510). The personalized entitlement data and available option information is provided to computer system 110 (see FIGS. 1A and 4) (512).

User input is received from card reader/writer 112 via computer system 110 (514). The information of the chipholder profile is modified according to the user input (516). The modified chipholder profile is provided to CMS 104 (see FIGS. 1A and 4) (518) and MSCT 500 stops (520).

User input is received from card reader/writer 112 via computer system 110 (512). The information of the chipholder profile is modified according to the user input (514). The modified chipholder profile is provided to CMS 104 (see FIGS. 1A and 4) (516).

FIG. 6 depicts a flow chart for application provider marketing process (APMP) 600. APMP 600 starts (602) and a determination is made whether the application provider has any marketing data that is desired to be sent to a chipholder when an application is added or modified (604). If not, APMP 600 stops (620). If so, APMP 600 determines whether the marketing data is application promotional data (606). If so, an APD message is prepared (608), the APD message is stored in a marketing file (610), and APMP 600 goes to step 612. If not, a determination is made whether the marketing data is application content data (612). If so, an ACD message is prepared (614), stored in the marketing file (616) and APMP 600 goes to step 618. A determination is made whether there is more marketing data to be analyzed (618). If so, APMP 600 goes to step 606. If not, APMP 600 stops (620).

FIG. 7 depicts a flow chart for application provider response process (APRP) 700. APRP 700 starts (702) and a determination is made as to whether a secure session with the CMS has been established (704). If not, APRP 700 stops (722). If so, a determination is made whether a request has been received from the CMS (706). If not, APRP 700 stops (722). If so, the application identifier in the request is compared to the marketing file (708). A determination is made whether the application identifier corresponds to an application promotional data message (710). If so, the APD message is added to the request message to create a response message (712) and APRP 700 goes to step 714. If not, APRP 700 goes to step 714. A determination is made whether the application identifier corresponds to an application content data message. If so, the ACD message is added either to the request message, if there was no APD match at step 710, or to the response message created at step 712 if there was an APD match at step 710 (716). APRP 700 goes to step 720. The response message is transmitted to the CMS. If there is another request (718), APRP 700 goes to step 708. If there is not another request, APRP stops (722).

Figure 8:
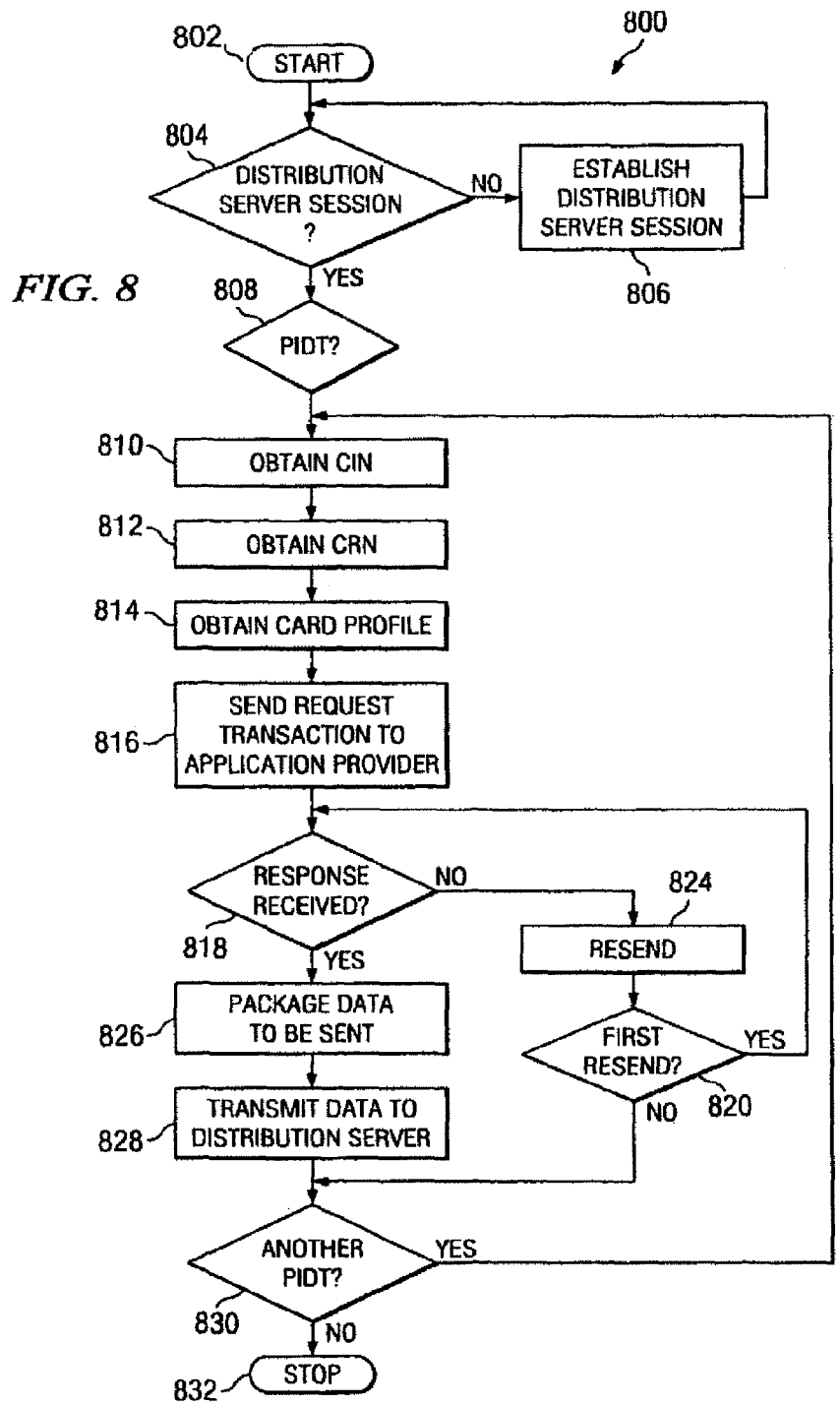
FIG. 8 is a flow chart of the CMS process.

FIG. 8 is a flow chart of chip management system process (CMSP) 800. CMSP 800 starts (802) and a determination is made whether a secure session has been established with the distribution server (804). If not, a secure session is established with the DS (806) and CMSP 800 goes to step 804. If so, a determination is made whether a post issuance data transaction has been made (808). If not, CMSP stops (826). If so, CMSP 800 obtains the CIN (810) and obtains the CRN (812). Using the CRN, CMSP 800 obtains the card profile instance (814). CMSP 800 sends a request notice to the AP (816). A determination is made whether a response is received from the AP (818). If not, the request is retransmitted (resent) to the application provider (824). A determination is made whether this resend of the request was the first resend transmission of the request (820). If not, CMSP 800 goes to step 830. If so, CMSP 800 goes to step 818. If a determination is made that a response has been received, CMSP 800 packages the data to be sent to the DS (826) and transmits the packaged data to the DS (828). A determination is made whether there is another PIDT. If so, CMSP 800 goes to step 810. If not, CMSP 800 stops (832).

Figure 9:
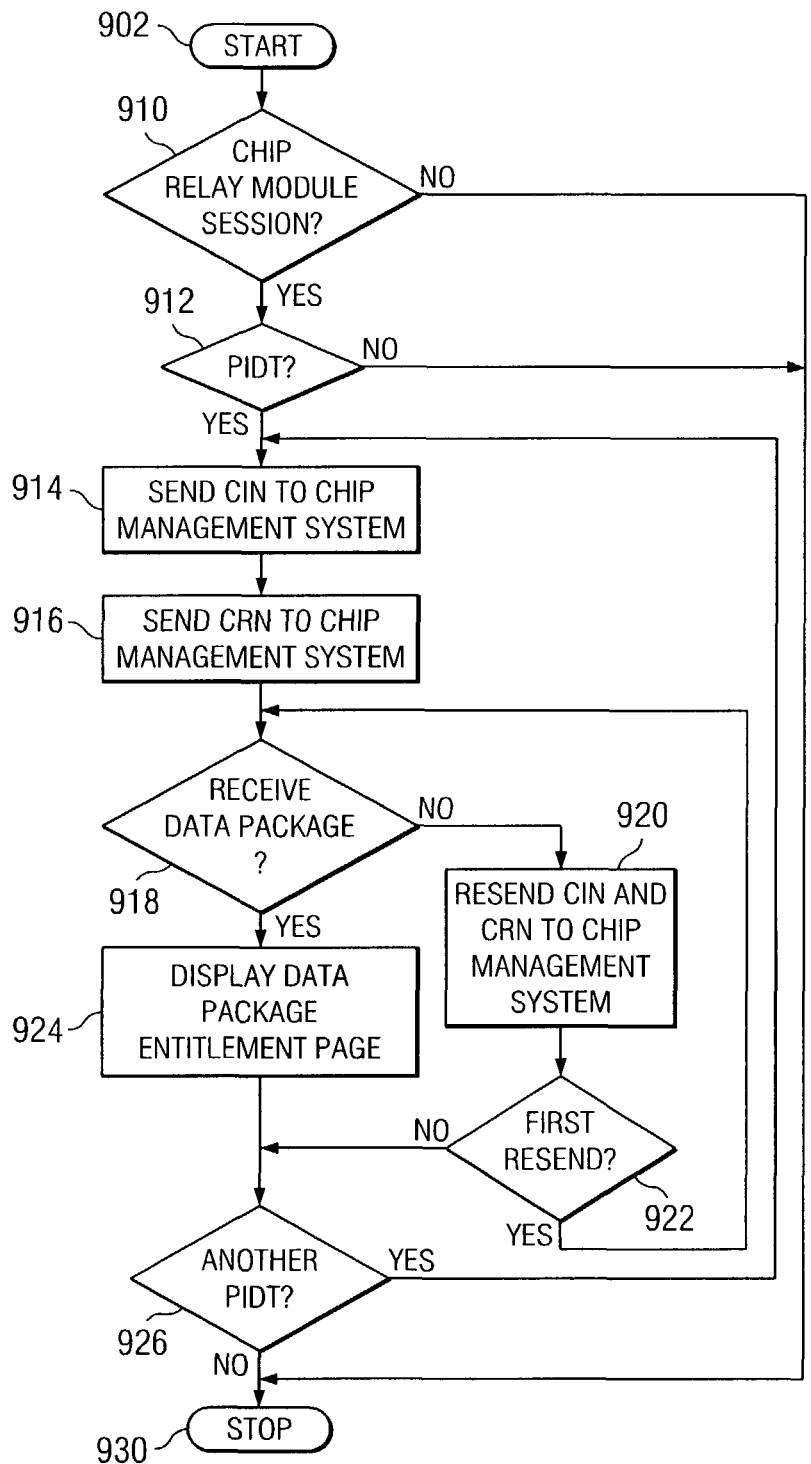
FIG. 9 is a flow chart of the distribution process.

FIG. 9 is a flow chart of distribution server process (DSP) 900. DSP 900 starts (902) and a determination is made whether a secure session has been established with the chip relay module (910). If not, DSP 900 stops (930). If so, a determination is made whether a post issuance data transaction has been made (912). If not, DSP 900 stops (930). If so, the CIN is sent to the CMS (914) and the CRN is sent to the CMS (916). A determination is made whether a data package has been received from the CMS (918). If not, the CIN and CRN are resent to the CMS (920) and a determination is made whether this was the first resend (922). If so, DSP 900 goes to step 918. If a data package has been received, DSP 900 displays the packaged data at the entitlement page (924). A determination is made whether there is another post issuance data transaction (926). If so, DSP 900 goes to step 914. If not, DSP 900 stops (926).

Figures 10, 11:
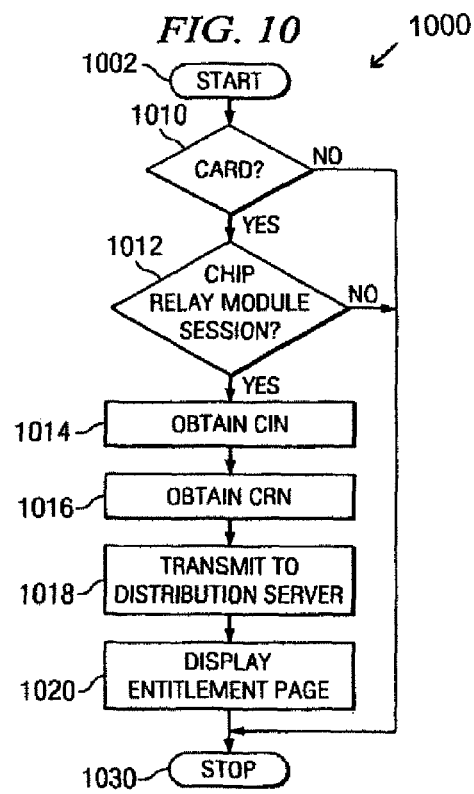
FIG. 10 is a flow chart of the chipholder process.
FIG. 11 depicts a request transaction message.

FIG. 10 is a flow chart of chipholder process (CP) 1000. CP 1000 starts (1002) and a determination is made whether a smart card has been inserted into an input device (1010). If not, CP 1000 stops (1030). If so, a determination is made as to whether a secure CRM session has been established with the DS (1012). If not, CP 1000 stops (1030). If so the CIN is obtained from the card (1014) and the CRN is obtained from the card (1016). The CIN and CRN are transmitted to the DS (1018). CP 1000 displays the entitlement page (1020). CP 1000 stops (1030).

FIG. 11 depicts request transaction message (RTM) 1100. RTM 1100 contains product identification 1110, cardholder identification 1120, CRN 1130 and application code 1140.

FIG. 12 depicts return message (RM) 1200. RM 1200 contains RTM 1100 including product identification 1110, cardholder identification 1120, DRM 1130, and application code 1140. In addition, RM 1200 has APD 1210 and ACD 1220.

FIG. 13 depicts entitlement page 1300. Entitlement page has card status section 1302 and application summary 1304. Application summary 1304 has Application Name column 1306, Application Status column 1308, User Actions column 1310 and Information column 1312. Referring to Application Name column 1306, for the application named Activity, User Actions column 1310 shows an "add" action and Information column 1312 shows a Loyalty Application. By way of example, if the user clicks on the application named Activity, APD message 1322 and ACD message 1324 appears in message area 1320. By way of example, the application named Activity may have an application id such as "Appl aid=003220001" 1140.

With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. The novel spirit of the present invention is still embodied by reordering or deleting some of the steps contained in this disclosure. The spirit of the invention is not meant to be limited in any way except by proper construction of the following claims.

What is claimed:

1. A method for updating an application on a smart card that has been read by a first computer, wherein the smart card includes a processor and a memory, the method comprising the steps of:
a server authenticating a user of the smart card based on a personal identification number (PIN) entered by the user at the first computer, and in response the server obtaining a unique number that is assigned to the processor of the smart card and stored on the smart card;
based on the unique number, the server identifying, from a user profile that is stored in the server for the user, a card profile of the smart card, wherein the card profile includes physical characteristics of the processor and the memory, and identities of a plurality of applications that are currently stored on the smart card and operable by the processor;
the server directing the first computer to display a page that includes an identification of the plurality of applications and permitted user actions; and
in response to the user performing one of the permitted user actions to modify one of the plurality of applications stored on the smart card
(a) the server updating the user profile, (b) the smart card modifying the one of the plurality of applications accordingly and (c) the server sending an advertisement to the first computer for display.

2. The method according to claim 1, further comprising the step of:
in response to receipt of the advertisement from the server, the first computer displaying the advertisement.

3. The method according to claim 1, wherein the card profile includes a key reference that is used to obtain a master key from the server, and wherein a private web key in the smart card is used with the master key for mutual authentication of the smart card.

4. The method according to claim 1, further comprising the steps of:
  the server generating a plurality of different smart card profiles for a respective plurality of smart cards issued to the user, wherein the plurality of smart card profiles include a respective plurality of unique identifiers of a respective plurality of processors within the respective plurality of smart cards; and
  the server storing the plurality of different smart card profiles in the user profile.

5. The method according to claim 4, further comprising the step of the server correlating the different unique identifiers of the respective plurality of processors to a respective plurality of sets of applications stored in the respective plurality of smart cards, and identifying to the first computer the plurality of sets of applications stored in the respective plurality of smart cards upon request.

6. The method according to claim 1, wherein the permitted user actions include changing preferences for the one of the plurality of applications.

7. The method according to claim 1, wherein the permitted user actions include updating the one of the plurality of applications.

8. A computer system for updating an application on a smart card that has been read by a first computer, wherein the smart card includes a processor and a memory, the computer system comprising:
  one or more processors, one or more computer-readable memories and one or more computer-readable storage devices, and program instructions, stored on at least one of the one or more storage devices for execution by at least one of the one or more processors via at least one of the one or more memories, the program instructions comprising:
  program instructions to authenticate, by a server, a user of the smart card based on a personal identification number (PIN) entered by the user at the first computer, and in response the server obtaining a unique number that is assigned to the processor of the smart card and stored on the smart card;
  program instructions, based on the unique number, to identify, using a server, from a user profile that is stored in the server for the user, a card profile of the smart card, wherein the card profile includes physical characteristics of the processor and the memory, and identities of a plurality of applications that are currently stored on the smart card and operable by the processor;
  program instructions to direct, by the server, the first computer to display a page that includes an identification of the plurality of applications and permitted user actions; and
  program instructions, responsive to the user performing one of the permitted user actions to modify one of the plurality of applications stored on the smart card, (a) to update, using the server, the user profile, (b) modify, by the smart card, the one of the plurality of applications accordingly and (c) send, using the server, an advertisement to the first computer for display.

9. The computer system according to claim 8, further comprising:
  program instructions, responsive to receipt of the advertisement from the server, to display, by the first computer, the advertisement.

10. The computer system according to claim 8, wherein the card profile includes a key reference that is used to obtain a master key from the server, and wherein a private web key in the smart card is used with the master key for mutual authentication of the smart card.

11. The computer system according to claim 8, further comprising:
  program instructions to generate, by the server, a plurality of different smart card profiles for a respective plurality of smart cards issued to the user, wherein the plurality of smart card profiles include a respective plurality of unique identifiers of a respective plurality of processors within the respective plurality of smart cards; and
  program instructions to store, by the server, the plurality of different smart card profiles in the user profile.

12. The computer system according to claim 11, further comprising program instructions to correlate, by the server, the different unique identifiers of the respective plurality of processors to a respective plurality of sets of applications stored in the respective plurality of smart cards, and identify to the first computer the plurality of sets of applications stored in the respective plurality of smart cards upon request.

13. The computer system according to claim 8, wherein the permitted user actions include changing preferences for the one of the plurality of applications.

14. The computer system according to claim 8, wherein the permitted user actions include updating the one of the plurality of applications.

15. A computer program product for updating an application on a smart card that has been read by a first computer, wherein the smart card includes a processor and a memory, the computer program product comprising:
  one or more computer-readable storage devices, and program instructions stored on the storage devices, the program instructions comprising:
  program instructions to authenticate, by a server, a user of the smart card based on a personal identification number (PIN) entered by the user at the first computer, and in response the server obtaining a unique number that is assigned to the processor of the smart card and stored on the smart card;
  program instructions, based on the unique number, to identify, using a server, from a user profile that is stored in the server for the user, a card profile of the smart card, wherein the card profile includes physical characteristics of the processor and the memory, and identities of a plurality of applications that are currently stored on the smart card and operable by the processor;
  program instructions to direct, by the server, the first computer to display a page that includes an identification of the plurality of applications and permitted user actions; and
  program instructions, responsive to the user performing one of the permitted user actions to modify one of the plurality of applications stored on the smart card, (a) to update, using the server, the user profile, (b) modify, by the smart card, the one of the plurality of applications accordingly and (c) send, using the server, an advertisement to the first computer for display.

16. The computer program product according to claim 15, further comprising:
  program instructions, responsive to receipt of the advertisement from the server, to display, by the first computer, the advertisement.

17. The computer program product according to claim 15, further comprising:

program instructions to generate, by the server, a plurality of different smart card profiles for a respective plurality of smart cards issued to the user, wherein the plurality of smart card profiles include a respective plurality of unique identifiers of a respective plurality of processors within the respective plurality of smart cards; and program instructions to store, by the server, the plurality of different smart card profiles in the user profile.

18. The computer program product according to claim 17, further comprising program instructions to correlate, by the server, the different unique identifiers of the respective plurality of processors to a respective plurality of sets of applications stored in the respective plurality of smart cards, and identify to the first computer the plurality of sets of applications stored in the respective plurality of smart cards upon request.

19. The computer program product according to claim 15, wherein the permitted user actions include changing preferences for the one of the plurality of applications.

20. The computer program product according to claim 15, wherein the permitted user actions include updating the one of the plurality of applications.

\* \* \* \* \*